United States Patent [19]
Keuchel et al.

[11] 3,861,843
[45] Jan. 21, 1975

[54] APPARATUS FOR FORMING LAMINAR CRIMPABLE FILAMENTS

[75] Inventors: Herbert W. Keuchel, Tallmadge, Ohio; Walter J. Polestak, Summit, N.J.

[73] Assignee: Celanese Corporation of America, New York, N.Y.

[22] Filed: July 17, 1973

[21] Appl. No.: 357,733

Related U.S. Application Data

[62] Division of Ser. No. 525,680, Feb. 7, 1966, Pat. No. 3,780,149.

[52] U.S. Cl. ............................. 425/198, 425/378 S
[51] Int. Cl. ................................................ D01d 3/00
[58] Field of Search ............... 425/198, 378 S, 199; 264/168, 171, 176 F

[56] References Cited
UNITED STATES PATENTS
3,408,277   10/1968   Martin et al. ..................... 264/168

FOREIGN PATENTS OR APPLICATIONS
625,023   8/1961   Canada ............................. 425/198

Primary Examiner—Robert D. Baldwin
Attorney, Agent, or Firm—Pamela D. Kasa

[57] ABSTRACT

Apparatus for producing a crimpable filament from a homogeneous polymer composition supply comprising means to divide the polymer supply into separate flow paths, means to subject each flow path to different environments and means to recombine the flow paths and extrude a two-component filament.

1 Claim, 8 Drawing Figures

APPARATUS FOR FORMING LAMINAR CRIMPABLE FILAMENTS

This invention, which is a Divisional application of copending application Ser. No. 525,680, filed Feb. 7, 1966, now U.S. Pat. No. 3,780,149, issued Dec. 18, 1973 is concerned with apparatus for the production of crimped filaments, and in particular with the production of crimped filaments produced from only one polymer or from a homogeneous polymer mixture.

Various methods have been proposed and used to produce synthetic crimped fibers or filaments which are used for bulked yarns and wool-like fabrics. One such prior method has comprised the spinning together of two different polymers in such a way that the two polymers are not appreciably blended together but are bonded together to form a single filament in the cross-section of which the diverse polymers form two or more distinct zones which extend along the entire length of the filament. The extrusion of the single filament may be such that the two polymers are localized and extend longitudinally along the filament in a side-by-side relationship, or the extrusion may be such that one polymer forms a core which is surrounded by a sheath of the second polymer. As the different polymers have substantially different physical properties, such as differing residual shrinkage, the filament tends to crimp upon application of a suitable after-treatment, such as stretching and drying.

However, this method has often produced filaments not completely satisfactory. When the filaments are spun into yarn, the resulting fabrics are often deficient in bulk and cannot be sufficiently fulled by finishing operations. Additionally, the fabrics are usually deficient with regard to resilience and stretchability, as well as with regard to recovery from deformation such as crushing or glazing. The fabrics also have been found to be difficult to uniformly dye, because the two polymers often have such varied chemical compositions. Further, this method requires preparation and handling of two different polymers, and thus requires apparatus which must separately melt and separately transfer the two polymers to the point where the polymers are brought together to form a single filament.

Other methods of producing crimped filaments have been developed which attempt to overcome the above-mentioned difficulties and disadvantages. For instance, it has been proposed to spin a crimped filament by using two solutions containing differing concentrations of the same polymer. If different solvents are used for the two solutions, however, separate apparatus must be used to mix and transfer the two different solutions; and in the case of systems where the spent solvent is regenerated to be used again, additional apparatus is necessary to separate the two solvents. If only one solvent is used, only one solution must initially be prepared, but thereafter the solution must be divided with one portion receiving additional solvent. Thus, those methods also essentially require the preparation of two separate flows of polymers with differing characteristics.

Accordingly, a general object of the present invention is the provision of a two-component crimped filament which substantially eliminates the disadvantages of two-component crimped filaments heretofore available.

A more specific object is the provision of apparatus which utilize only one polymer to produce a two-component crimped filament.

A further object of this invention is the provision of apparatus for producing a two-component crimped filament which requires the preparation of only one polymer and which eliminates the necessity of subsequent additions of other components.

Another object of the present invention is the provision of apparatus for producing a two-component crimped filament having superior crimp retention and bulk characteristics.

Yet another object is the provision of a crimped filament which may be easily and uniformly dyed and which is thus suitable for yarns and wool-like fibers.

The present invention visualizes a melt spinning apparatus for producing two-component laminated filaments from a single polymer by separating the polymer into a plurality of flow paths and subjecting each of the flow paths or streams of molten polymer to different thermal and shear environments to change its respective melt flow or shrinkage characteristics. The flow paths are then recombined and passed through a single jet to form an integral, laminated filament which has superior crimp potential characteristics. The filaments may be of any desired size, for instance, between about 5 and 200 denier or finer.

A better understanding of the present invention may be obtained by reading the following detailed specification in connection with the accompanying drawings, in which.

Figure 1:
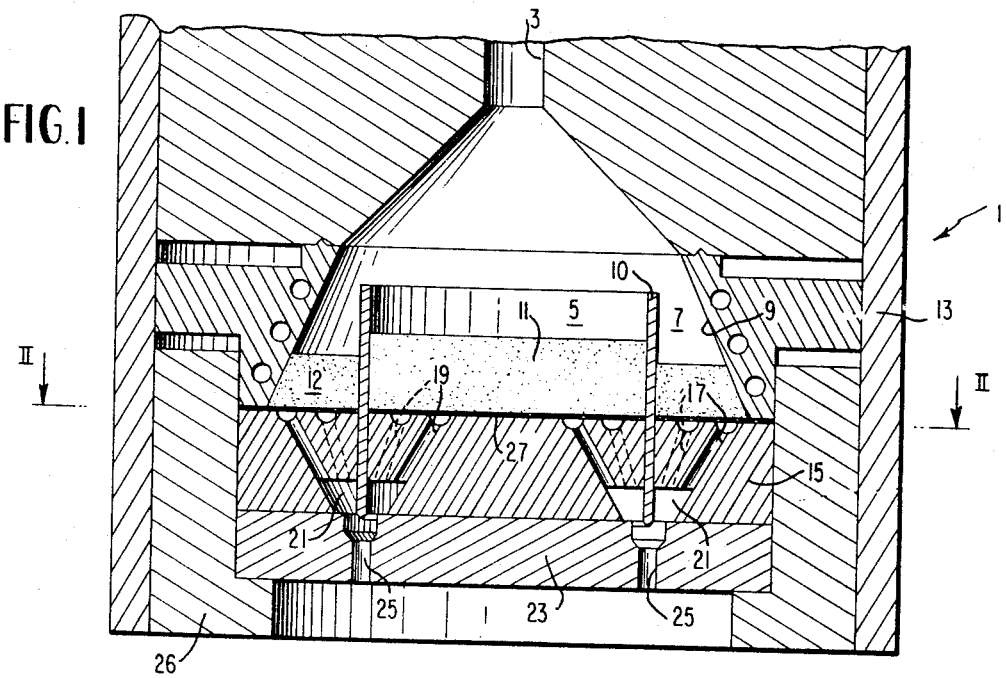
FIG. 1 is a cross-sectional view of one form of melt spinning pack assembly utilized in the present invention, comprising two concentric chambers separated from each other by a cylindrical wall.

Referring first to FIG. 1, the upper chamber of the melt spinning pack 1 of the instant invention has an opening 3 through which a molten polymer stream may enter the pack. The polymer flow may be supplied by a conventional screw extruder or by other equivalent means which pumps a polymer stream of a constant volume displacement through opening 3. The polymer stream is then separated into two flow paths by the concentric chambers 5 and 7. These chambers are defined by the spinning pack wall 9 and an inner circular wall 10, and are dimensioned to break up the polymer stream into two flow streams of predetermined relative volumes. The two flow streams may have substantially equal volumes, or the volumes may differ from each other. A shear resistance medium 11 partially fills the inner chamber 5, while a medium 12 having differing shear resistance characteristics is disposed within the outer chamber 7. A circular heating element 13 surrounds the outer chamber 7 to supply a predetermined level of heat to the two flow paths or polymer streams as they pass through the shear resistance media in the two chambers.

Disposed directly below the two concentric chambers is a circular distributor plate 15, which includes a plurality of flow channels 17 and 19. The upper face of the distributor plate 15 may be best seen in FIG. 2, which shows the flow channels arranged into two groups of circular patterns, separated by circular divider or inner wall 10. Of course, a greater or lesser number of circular patterns may be provided as desired. The circular inner wall 10 separates the two groups of flow channels so that the inlets of the flow channels 17 open into only outer chamber 7, while the flow channels 19 have inlets which open up only into the inner chamber 5. Referring again to FIG. 1, each of the flow channels may be seen to slant inwardly through the distributor plate 15 so that each of the flow channel outlets opens up into a relatively large outlet 21. While outlet 21 may be of a number of different shapes, the illustrated dovetail shape has been found to be of particular utility in producing the crimped filaments of the present invention. The circular divider 10 may extend downwardly into the large outlet 21 so as to keep the two separate polymer streams substantially unmixed as they leave the large outlet. A spinneret jet plate 23 is disposed directly under the distributor plate 15 and includes jet capillaries 25 located directly under each large outlet 21. Both the plate 15 and jet plate 23 are securely held in position by the support member 23.

It will thus be understood that a molten polymer stream enters opening 3 and is separated into two flow paths, each flow path being directed through a different chamber. As described earlier herein, each chamber contains a different shear-resistance medium and thus, although substantially uniform heat is applied to the polymer flow paths, or streams by the heating element 13, the stream passing through the more resistant or firmer size medium will be held up for a longer period of time than the remaining stream. Because of the longer hold-up time, the one stream is subjected to the heat longer than the other stream. Filtration sand having different fineness, such as different mesh sizes of silica sand or the like, has been found to be particularly effective in regulating the hold-up time of the polymer flow path. The shear-resistance medium is retained and kept from being carried through the flow channels by a retainer 27 made of a suitable material, such as felt metal of a predetermined porosity.

For instance, in a preferred embodiment as shown in FIG. 1, the flow path directed through chamber 7 is held up for a predetermined period of time by the shear-resistance medium such as silica sand 12 and finally enters the flow channels 17 and the large outlet 21, while the flow path being directed through chamber 5, which contains the finer sand 11, is held for a longer period of time before entering the flow channels 19 and then the large outlet 21. The two flow paths are then recombined at the jet capillaries 25 to form single filaments. As the two polymer flow paths are not randomly intermixed, each single filament will be composed of two polymer fractions having differing thermal histories and thus has a cross-section which may be generally like that shown in FIG. 3, wherein a single filament may be seen to be comprised of a polymer fraction 23 and a different polymer fraction 20. The differing thermal histories cause the melt flow characteristics of the two flow paths or streams to be changed, and the resulting fractions exhibit different shrinkage potentials to cause the filament to coil or crimp. For instance, in the case of typical fiber-grade oxymethylene or acetal polymers a sufficient difference in flow characteristics to produce the desired effect can be obtained by maintaining one portion of the polymer feed at about 180°C. for an average residence time of about 380 seconds while maintaining the other polymer feed portion at about the same temperature for about 540 seconds.

Figure 3:
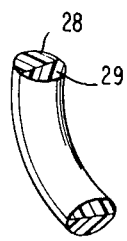
FIG. 3 is a sectional perspective of a fragment of a filament produced in accordance with the present invention.
Figure 7:
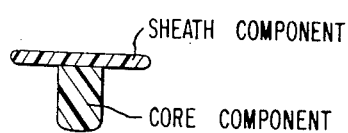
FIG. 7 is a cross-sectional view of a filament of this invention having a T-shape cross-section.
Figure 8:
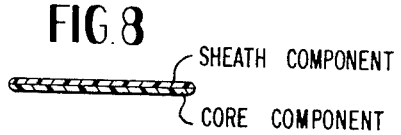
FIG. 8 is a cross-sectional view of a similar filament having a rectangular cross-section.

It should be apparent to one skilled in the art that with slight modifications of the illustrated spinning apparatus each filament could be extruded in a manner so as to have a core of one polymer fraction surrounded by a sheath of the other polymer fraction, instead of having the abutting laminar structures shown in FIGS. 3, 7 and 8.

Various other means of subjecting each of the flow paths to a different thermal history are envisioned by the present invention. For instance, instead of using different media such as filtration sand of different fineness in the two chambers, the depth of the medium in one chamber may be made different from that in the other or the geometric configuration of the two channels may be changed such that the polymer flowing through one chamber must travel a longer or more tortuous path than the polymer flowing through the other channel. Alternatively, the dimensions of the flow channels 17 and 19 might be changed in relation to each other to provide a smaller diameter for some of the flow channels than for the remaining flow channels. Another variation of the present invention envisions heating the polymer stream in one chamber to a higher temperature than the stream in the other chamber, for instance, by maintaining a decreasing temperature gradient between outer wall 9 and the center of inner chamber 5. Still another variation involves the use of chemically different media in the two chambers, such as the use of sand or other inert solid in one chamber and, in the other, a catalytically active solid such as an aluminum silicate molecular sieve or other cracking catalyst which suitably accelerates the desired limited degradation of the polymer. Any of the above mentioned variations of the present invention can be adapted to produce desired equivalent changes of the thermal history or chemical degradation of the two polymer streams.

The previously discussed changes in the polymer stream's thermal histories occur mainly in that polymer flow path or stream which is subjected to the thermally more severe conditions. For instance, with respect to most common melt-spun polymers, such as polyamides (nylon), polyurethanes, fiber-forming olefin polymers such as polypropylene or poly-3-methylbutene, oxymethylene polymers or polyethylene terephthalate, the increased hold-up time in a chamber causes the polymer's molecular weight to be varied. In general, thermal decomposition leads to a reduction in the melt viscosity of a polymeric system. Thermal decomposition, however, may also lead to branching and cross-linking. This naturally causes an increase in melt viscosity and eventually "gelling." Either of these changes will produce different shrinkage potentials with respect to the substantially unchanged polymer stream. Minor differences in melt viscosities have thus been surprisingly found to produce structural changes in the polymer which are sufficient to alter its shrinkage potential and thereby result in the desired crimp. Hard to melt portions contained in a polymer stream or flow path, such as crystallites or gels will melt more easily and in a more uniform manner after such a polymer stream has been subjected to controlled degradation in accordance with this invention. Consequently, such portion will exhibit different crystallization behavior upon solidification than a substantially unchanged portion of the same original polymer.

After extrusion of the laminated filaments as described above, further treatment has been found to produce crimped filaments of higher quality. For instance, the amount of draw-down and the rate of draw-down of the filaments from the jet capillaries will effect the filament orientation and therefore the quality of the crimp of the filament. After take-up of the filament, stretching by conventional means was also found to vary the quality of filament produced by the present invention. For example, some samples of the filaments packaged at constant length were initially unbulked, but were found to bulk upon stretching, whereas samples stretched during spinning between the rolls and the take up machine bulked after spinning.

Heat setting after the draw-down and take up of the filaments was found to produce increased crimp in most instances. Samples heat set prior to bulking produced less bulk than the original filaments, but heat setting after bulking produced an increased crimp in the filaments. "Heat setting," as used herein, refers to the process of subjecting yarn, free to shrink, to an elevated temperature in the range of between about 60° and 150°C. Optimum temperature depends, of course, on the particular polymer used.

The following examples are illustrative of the present invention rather than limitative. The following symbols will be utilized to describe the quality of the crimp of the filaments produced by the instant invention:

KEY TO THE BULK RATING SYMBOLS

| Symbol | Definition<br>How and when crimp was developed |
|---|---|
| 1 | No crimp after take-up, no improvement on stretching |
| 2 | No crimp after take-up, crimp after or during stretching or specified after-treatment |
| 3 | Crimp after take-up |
|  | Character and intensity of crimp |
| A | Long waves |
| B | Short waves |
| C | Short waves, beginning to spiral |
| D | Spirals |
| E | Intense spirals |
|  | Uniformity of crimp |
| X | Fil to fil variation |
| Y | Longitudinal variation |

EXAMPLE I

Figure 2:
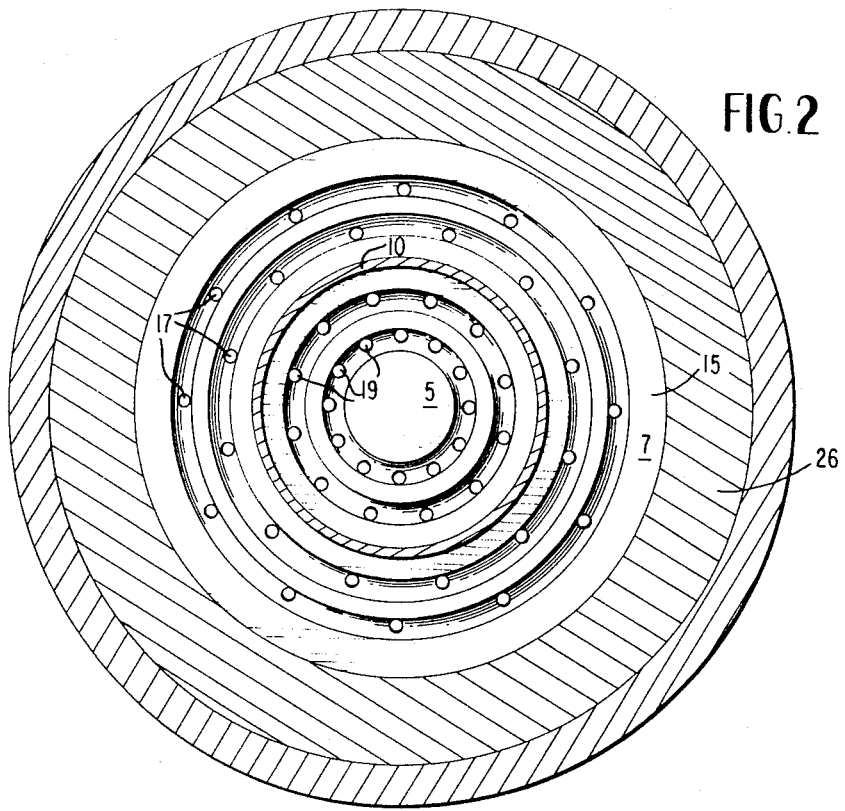
FIG. 2 is a cross-sectional view taken generally along the sectional line II—II in FIG. 1.

A fiber-grade polypropylene (Profax 6559) was used in this example. Its intrinsic viscosity was between 1.7 and 2.2, determined in decalin (C = 0.1% solution) at 135°C. Its melt index (according to ASTM D 1233-57-T) was 3.7 at 230°C. and 0.072 at 190°C. This polymer was passed in a molten state at a temperature of about 250°C., through a melt spinning pack constructed as illustrated in FIGS. 1 and 2 hereof. Silica sand of 30/40 mesh size was placed in the outer chamber 7 to a depth of 16 mm, while silica sand of 60/80 mesh size was placed in chamber 5 to a like depth of 16 mm. A circular sand retainer was constructed of felt metal of 40 percent porosity. The average residence time at extrusion temperature of the molten polymer passing through chamber 7 was about 380 seconds while the average residence time at extrusion temperature of the molten polymer passing through chamber 5 was about 510 seconds. Seventeen flow passages, each having a diameter of .04 inch, were disposed around a 1 inch diameter circle. The non-heat stabilized polypropylene was fed through the opening of the melt spinning pack by a conventional vertical screw feeding a metering pump at a controlled constant pressure of about 1,000 psi. The extruded filaments were heat set at 120°C. for approximately thirty minutes.

Table I below summarizes the effects of different extrusion temperatures and of heat setting upon the crimp of the produced filaments. As will be seen from this table, the stretched samples bulked upon packaging, while the constant length samples had to be stretched to produce satisfactory crimping. Heat setting the stretched bulked samples increased the bulk to a still higher spiral crimp.

TABLE I

Effect of Extrusion & Spinning Conditions on Bulking
Extrusion Rate: 4.0 g/min.

| Extrusion Temp. °C. | | Roll m/min | Take-Up m/min | Packaged on Take-Up | Crimp Rating Heat Set 120°C. | |
|---|---|---|---|---|---|---|
| Block | Pack | | | | As Spun | After Bulking |
| 250 | 250 | — | 400 | Constant length | 2-A-Y | — |
| 255 | 255 | 400 | 800 | Stretched | 3-B | E |
|  |  | — | 400 | Constant length | 1 | — |
| 260 | 260 | 400 | 800 | Stretched | 3-B-Y | E |
|  |  | — | 400 | Constant length | 2-A | — |
| 270 | 270 | 400 | 600 | Stretched | 3-B | B |
|  |  | — | 400 | Constant length | 2-B-Y | — |
|  |  | 400 | 800 | Stretched | 3-B, 3-D | D,E |
| 245 | 245 | 400 | 800 | Stretched | 3B | E |

EXAMPLE II

A fiber-grade acetal copolymer of trioxane and ethylene oxide (Celcon N-90) was passed through a melt spinning pack constructed as illustrated in FIGS. 1 and 2. As in Example I, silica sand of 30/40 mesh size was placed in a depth of 16 mm in the outer chamber 7 and the same depth of silica sand having 60/80 mesh size was placed in the inner chamber 5. The sand retainer was made of 50/200 mesh steel wire screen. The results are summarized in Table II.

TABLE II

Effect of Extrusion Conditions on Bulking
Extrusion Rate: 4.0 g/min.

| Extrusion Temp.°C. | | Roll m/min | Take-Up m/min | Bulk Rating | |
|---|---|---|---|---|---|
| Block | Pack | | | Before | After (Heat Setting) |
| 195 | 195 | — | 400 | 2-A | — |
|  |  | — | 800 | 2-A | — |
|  |  | 400 | 800 | 3-B | E |
| 190 | 190 | — | 200 | 2-A | — |
|  |  | — | 400 | 3-B | A |
|  |  | 400 | 800 | 3-B | E |

The bulk rating symbols, previously explained, show that an increased rate of take-up of the produced filaments favorably affects the quality of the crimp. For instance, a high rate of take-up of 800 m/min was found to produce short crimped waves in the filament before heat setting, and an intense spiraled crimp after heat setting.

EXAMPLE III

In this example fiber-grade polypropylene was treated under different conditions to show the effect of varying the mesh size of the shear resistance material in combination with varying the extrusion temperature. The results are summarized in Table III.

able results. Additionally, Table III shows an apparent trend toward more intense crimping upon decreasing sand particle size and thus increasing the hold-up time of each polymer flow path.

EXAMPLE IV

The acetal copolymer of Example II was passed through a melt spinning pack of the instant invention under different conditions to show the effect of extrusion temperature, take-up speed and stretch on the bulk and texture development of filaments spun by the

TABLE III

Effect of Extrusion & Spinning Conditions on Yarn-Bulk Formation of Polypropylene Yarn

| Pack Composition (Mesh, Sand) | | Extrusion Temp. °C. | Stretch on Take-up m/min | Bulk Rating at Given Take-Up Speed m/min | | |
|---|---|---|---|---|---|---|
| Outer Chamber | Inner Chamber | | | <400 | 400–800 | >800 |
| 30/40 | 40/50 | <260 | + | — | 3-B | — |
| | | | — | — | 2-A | — |
| | | 265–275 | + | 3-B | 3-B | 3-A |
| | | | | | 3-E | |
| | | | — | 2-A | 2-A | 2-A |
| | | | | | 2-D | |
| | | >275 | — | 1 | — | — |
| 30/40 | 50/60 | <260 | + | — | — | — |
| | | | — | — | — | — |
| | | 265–275 | + | 1 | 1 | 3-A |
| | | | — | — | — | — |
| | | >275 | + | 2-A | 2-A | 2-A |
| | | | — | — | — | — |
| 30/40 | 60/80 | <260 | + | — | 3-B | — |
| | | | — | 2-A | 2-A,2-E | 2-B,2-A |
| | | | | 2-E | 2-A | |
| | | 400–800 | + | 1 | 3-D | 1 |
| | | | | | 3-B | |
| | | | — | 2-B | 2-D | 2-D |
| | | | | | 2-D | |
| | | >260 | + | — | — | — |
| 30/40 | 100/120 | <260 | + | — | — | — |
| | | | — | — | — | — |
| | | 265–275 | + | 2-C | 3-C | 3-B |
| | | | — | 1, 2-A | 2-A,2-A | 2-A,2-B |
| | | >260 | + | 1 | 1 | 2-A |
| | | | — | — | — | — |
| 60/80 | 100/120 | <260 | +— | — | — | — |
| | | | — | 2-D | 2-D | 2-A |
| | | 265–275 | +1 | 3-C | 3-A | — |
| | | | — | — | 2-D-X | — |
| | | >260 | + | — | — | — |
| | | | — | 1 | 2-A | 2-A |

From this data it appears that filaments having excellent crimping characteristics may be obtained from passing fiber-grade polypropylene through a melt spinning pack of the present invention having seventeen flow passages of 0.04 inch diameters arranged as a one-inch circle. Placing 30/40 mesh silica sand in a depth of 16 mm in the outer chamber and 40/50 mesh sand in a depth of 16 mm in the inner chamber was found to give excellent results. An extrusion temperature of 265°–275°C. and a take-up speed of 400–800 m/minute may be seen from the table to give particularly desirpresent invention. The results are summarized in Table IV.

Highly crimped filaments were obtained at take-up speeds greater than 400 m/minute over a temperature range from 175° to 190°C. Filaments having intense spirals were produced after take-up at a high speed from an extrusion of approximately 185°C. At a lower rate of take-up speed, intense spirals occurred at an extrusion temperature of 175°C. Different combinations of conditions can thus be used to obtain similar fiber properties as desired.

TABLE IV

Effect of Extrusion & Spinning Conditions on Yarn-Bulk Formation of Polyacetal Yarn Spun in a Dual-Chamber Spinning Pack

| Pack Composition (Mesh, Sand) | | Extrusion Temp. °C. | Stretch on Take-Up | Bulk Rating at Given Take-Up Speed, m/min | | |
|---|---|---|---|---|---|---|
| Outer Chamber | Inner Chamber | | | L <450 | H 450–800 | H >800 |
| 30/40 | 60/80 | 175 | — | 3-D,2-C | 2-D,2-D | — |
| | | | | 2-D | | |
| do. | do. | 180 | + | — | 3-E,3-E | — |
| | | | — | — | 3-E | — |
| do. | do. | 185 | + | — | 3-E | 3-B,3-D |
| | | | — | 2-A,2-C | — | — |
| | | | | 2-C | | |
| | | | + | — | 3-D,3-B | 3-E,3-E |
| | | | | | 3-B,3-B | 3-E |

TABLE IV—Continued

Effect of Extrusion & Spinning Conditions on
Yarn-Bulk Formation of Polyacetal Yarn Spun
in a Dual-Chamber Spinning Pack

| Pack Composition (Mesh,Sand) | | Extrusion Temp. °C. | Stretch on Take-Up | Bulk Rating at Given Take-Up Speed, m/min | | |
|---|---|---|---|---|---|---|
| Outer Chamber | Inner Chamber | | | L <450 | H 450–800 | H >800 |
| do. | do. | 190 | − | 2-E,2-A | — | — |
|  |  |  | + | — | 3-B,3-B 3-E | 3-B,3-B |
| do. | do. | 210 | − | 2-A | — | — |
|  |  |  | + | — | 3-B,3-B | — |

EXAMPLE V

In this example the parent stream of the acetal copolymer of Example II was subjected to a differential chemical treatment. This was accomplished by passing one branch of the divided melt stream through a pack chamber containing silica sand while forcing the other stream through a different chamber containing silica sand and a cracking catalyst. The catalyst used was an aluminum silicate molecular sieve compound (Linde Molecular Sieve Type SX Lot 136980; as described in U.S. Pat. Nos. 2,882,243 and 2,882,244). In this example, the polymer portion going through the catalyst bed experiences a higher degradation than the other flow stream. Differential degradation for optimum spinning performance can be controlled by proper choice of purely thermal conditions (as in Examples I–IV), or by proper choice of both thermal conditions and chemical environment (Example V).

Figure 4:
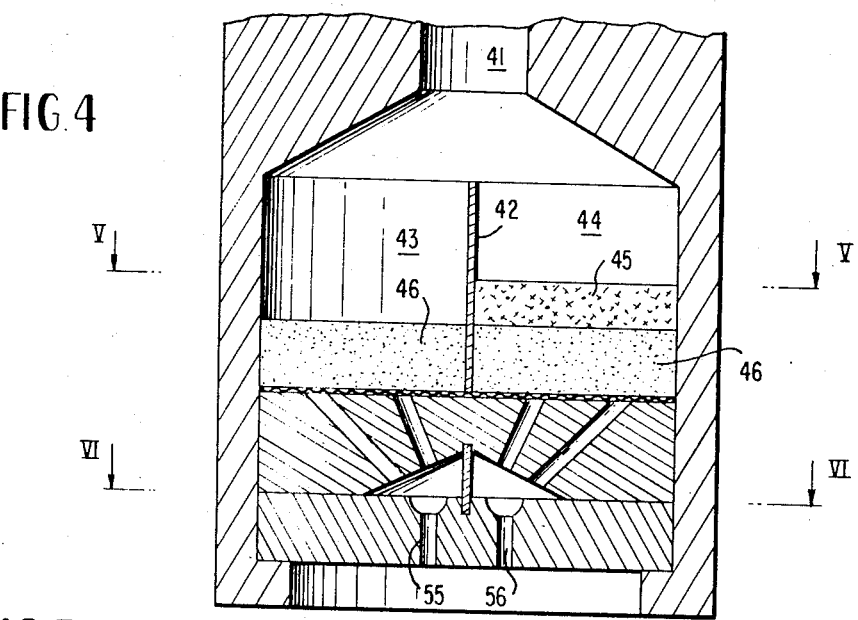
FIG. 4 is a cross-sectional view of a form of circular pack assembly comprising two semi-circular chambers separated from each other by a straight wall.
Figure 5:
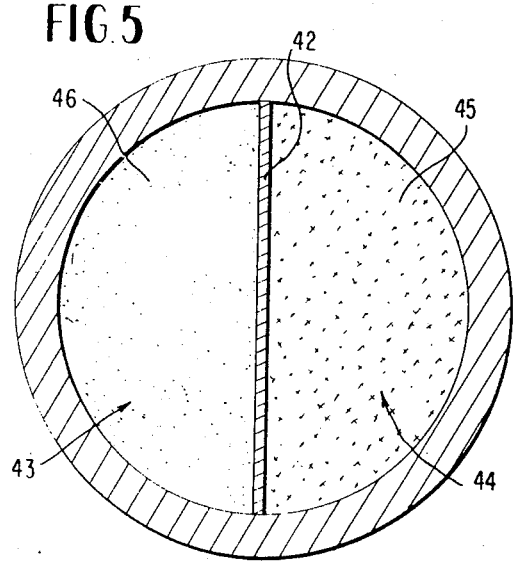
FIG. 5 is a cross-sectional view taken generally along the sectional line V—V in FIG. 4.
Figure 6:
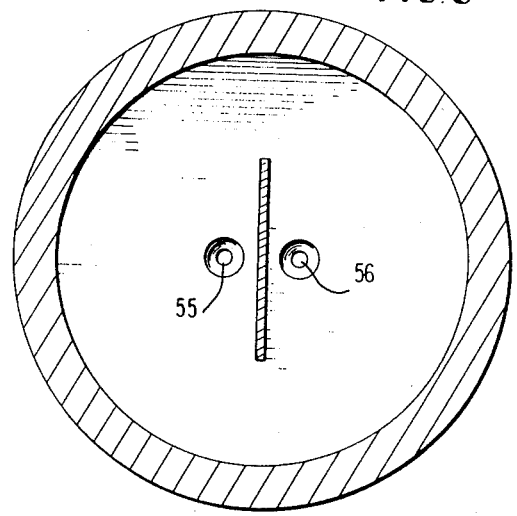
FIG. 6 is a cross-sectional view taken generally along the sectional line VI—VI in FIG. 4.

To illustrate the differential effect more quantitatively, the divided melt spinning pack shown in FIG. 4 was used in this example. Unlike the device illustrated in FIGS. 1 and 2, the pack shown in FIG. 4 permits separate recovery, and hence separate evaluation, of each of the differently treated polymer streams or filament. More particularly, referring to FIG. 4, the polymer enters the pack at 41, is then divided by a linear wall 42 such that both chambers 43 and 44 assume the cross-sectional configuration of a half-circle (FIG. 5). The melt stream passing through chamber 43 is forced through a layer of silica sand 46; the other stream passing through chamber 44 encounters first the catalyst 45 and then a layer of silica sand 46. Both streams are kept separated (FIG. 6) in order to determine differences in molecular weight and fiber tensile properties as affected by their differential treatment. Each of the two jet holes 55 and 56 (FIGS. 4 and 6) were 0.02 inch in diameter and 0.1 inch in length. The data are presented in Tables V and VI.

TABLE VI

Effect of Differential Chemical Treatments
On Spinning Speed

| Extrusion Conditions | | Maximum Take-Up Speed, m/min | |
|---|---|---|---|
| Throughput Rate g/min | Temperature °C. | a** | b** |
| 1.0 | 180 | 1800 | 1000 |

** Same significance as in Table V.

In summarizing the data in Tables V and VI, the following conclusion can be stipulated:

| Melt Stream According to Figure 4 | Chamber 43 | Chamber 44 |
|---|---|---|
| Catalyst | No | Yes |
| Relative Polymer Degradation (Based on inherent viscosity) | Low | High |
| Relative Viscosity (Based on polymer throughput rate per hole or denier per hole) | High | Low |
| Filament Tensile Properties: | | |
| a) Tenacity | Higher | Lower |
| b) Elongation | Higher | Lower |
| Spin-Line Stability (Based on maximum take-up speed, Table VI) | Higher | Lower |

EXAMPLE VI

Self-bulking polyester fibers have been produced according to the spinning and extrusion procedures as well as apparatus described in Examples I and III. The process data are summarized below.

Polymer: "Fortrel" Fiber-grade polyethylene terephthalate

Inherent Viscosity (determined in a solution of 0.1% polymer in a mixed solvent of 7/2 Phenol/trichlorophenol) 0.65

Spinneret: 17 holes 0.04 in. diameter 0.20 in. long each (holes) located on a 1-inch diameter circle.

TABLE V

Differential Chemical Degradation of One Parent Melt Stream

| Pack Content | Chamber 43 | Chamber 44 |
|---|---|---|
| Sand, g | 3.3 | 3.3 |
| Mesh Size | 60/80 | 60/80 |
| Catalyst Type | — | Linde Molecular Sieve Type 3X |
| Volume, cc | — | ~ 2 |

| Extrusion Rate, g/min | Temp. °C | Take-Up Speed m/min | Yarn I.V.* | | Denier | | Tensile Properties** | | | | | |
|---|---|---|---|---|---|---|---|---|---|---|---|---|
| | | | | | | | Elongation % | | Tenacity g/d | | 1/2(2) TE | |
| | | | a | b | a | b | A | b | a | b | a | b |
| 1.9 | 180 | 110 | 1.38 | 1.42 | 74 | 69 | 650 | 680 | 0.76 | 0.77 | 19.5 | 20 |
| 1.9 | 200 | 100 | 1.40 | 1.45 | 81 | 76 | 510 | 740 | 0.60 | 0.82 | 13.5 | 22.3 |
| 0.74 | 200 | 50 | 1.40 | 1.42 | 94 | 63 | 580 | 670 | 0.60 | 0.74 | 14.3 | 19.1 |
| 0.74 | 200 | 500 | — | — | 7.8 | 6.7 | 190 | 191 | 1.06 | 1.43 | 14.6 | 19.9 |

* Inherent Viscosity LnNr/C; determined with a 0.1% solution of polymer dissolved in a solvent consisting of 98% p-chlorophenol and 2% α-Pinene.
**(a) corresponds to properties obtained from spinning capillary (56) going through Chamber 44.
(b) corresponds to properties obtained from spinning capillary (55) going through Chamber 43.

-Continued

Melt Spinning Back Chamber

| (According to Figure 1 | Chamber 7 | Chamber 5 |
|---|---|---|
| Sand | 60/80 | 100/120 |

Extrusion Conditions

| Temp. °C. | Pack Pressure, psig | Take-Up Speed m/min | Steam Conditioning Tube, psi | Crimp Rating |
|---|---|---|---|---|
| 280 | 1600 | 400 | 15 | 2-A |

Polymer: "Fortrel" Fiber-grade polyethylene terephthalate

Inherent Viscosity (determined in a solution of
0.1% polymer in a mixed solvent of 7/2 Phenol/trichlorophenol) 0.65

Spinneret: 17 holes 0.04 in. diameter 0.20 in. long each
(holes) located on a 1-inch diameter circle.

Melt Spinning Back Chamber

| (According to Figure 1 | Chamber 7 | Chamber 5 |
|---|---|---|
| Sand | 60/80 | 100/120 |

Extrusion Conditions

| Temp. °C. | Pack Pressure, psig | Take-Up Speed m/min | Steam Conditioning Tube, psi | Crimp Rating |
|---|---|---|---|---|
|  |  | 800 | 15 | 2-A |
|  |  | 400 | Off | 1 |
|  |  | 800 | Off | 1 |
| 270 | 2100 | 400 | 20 | 2-A |
| 290 | 1500 | 400 | 20.5 | 1 |
| 280 | 2000 | 400 | 24.75 | 2-A |

After-treatments such as heat relaxation (a) over a heated plate, (b) in a vacuum oven, or (c) steam autoclave, caused shrinkage and increased crimp intensity of a rating of 2-C. Hot or cold drawing produced crimp ratings of about 2-B.

EXAMPLE VII

Self-bulking yarns have been produced in this example by differential treatments of a common polymer stream and rectangular spinnerets. Polyethylene terephthalate (same as in Example VI) was used as the polymer. The apparatus used was similar to the one shown in FIG. 1 except that it was scaled up such that its pack total hold-up volume was 80 cc and the volume ratio of chamber 7 to chamber 5 was 2:1.

Rectangular and T-shape jets were employed to provide an asymetric geometry and possibly produce a preferred bending axis during bulking. The sheath and core polymer streams were combined, with minimum intermixing in the jet countersink. The special distribution of the two different polymer fractions, comprising the final fiber, is prodetermined by jet design and the location of the holes in relation to the two polymer streams. In this example, the rectangular or slot-shape spinneret produced a laminated filament having a rectangular cross-section as illustrated in FIG. 8. The spinneret containing capillaries with T-shape cross-sections was employed producing fibers of like cross-sections, whereby each leg of the T-configuration consists, primarily, of one or the other melt stream as illustrated in FIG. 7.

Extrusion and take-up conditions are similar to the ones shown in Example VI. The spun fibers were drawn over a hot shoe in order to improve fiber tensile properties, and subsequently boiled off, allowing the fibers to relax freely to develop crimp due to their differential shrinkage potential. Fibers with up to 18 percent crimp have been produced. Table VII summarizes these results.

TABLE VII

Tensile Properties and Process Conditions of Self-Crimping Polyester Fibers

| Spinneret Cross-Section | Crimp % | Take-Up Speed m/min | Steam Condition | Quench Collar No. | Quench Medium | Denier As Is | Denier Boil-Off | Ten., g/d As Is | Ten., g/d Boil-Off | Elong.,% As Is | Elong.,% Boil-Off |
|---|---|---|---|---|---|---|---|---|---|---|---|
|  | 18 | 100 | + | 4 | Precooled Air | 16 | 30 | 1 | 1 | 40 | 190 |
|  | 16 | 100 | + | 4 | do. | 16 | 20 | 2 | 1.4 | 30 | 120 |
| Rectangular | 7 | 100 | − | 4 | do. | 8 | 17 | 3 | 2 | 60 | 90 |
|  | 11 | 300 | + | 4 | do. | — | 9 |  | 2 | — | 140 |
|  | 6 | 300 | − | 4 | Air | — | 19 |  | 0.6 | — | 320 |
| T-Shape | 7 | 100 | + | 2 | Air | 14 | 17 | 3 | 2 | 60 | 160 |
|  | 10 | 300 | + | 2 | Air | 8 | 12 | 2 | 2 | 50 | 140 |

(1)No. 2 produces a quench air stream parallel to the fiber axis.
No. 4 produces a cyclonic flow pattern around the fiber axis.

It will be apparent to those skilled in the art that various other modifications within the spirit and scope of the invention are possible. For instance, while the invention is of particular advantage in connection with melt spinning, the differential thermal or thermal-chemical treatment on which this invention is based may also be applied in solution spinning, i.e., by subjecting two parts of the same polymer solution to different degradation treatments. The invention should not be deemed to be limited by what has been shown and described herein by way of illustration, except as particularly pointed out in the appended claims.

What is claimed is:

1. An apparatus for forming a crimpable filament from a single polymer composition comprising,
   means for receiving a flow of said polymer composition in a molten state,
   at least two chamber means for receiving separate portions of said flow, each of said chamber means containing a porous element having differing shear resistances, means for subjecting said separate portions to a predetermined different thermal environment in said chamber means,
   means for combining said portions of said flow upon exit from said chambers and means for jointly extruding said combined portions to form laminar crimpable filaments from said combined polymer portions.

* * * * *